UNITED STATES PATENT OFFICE.

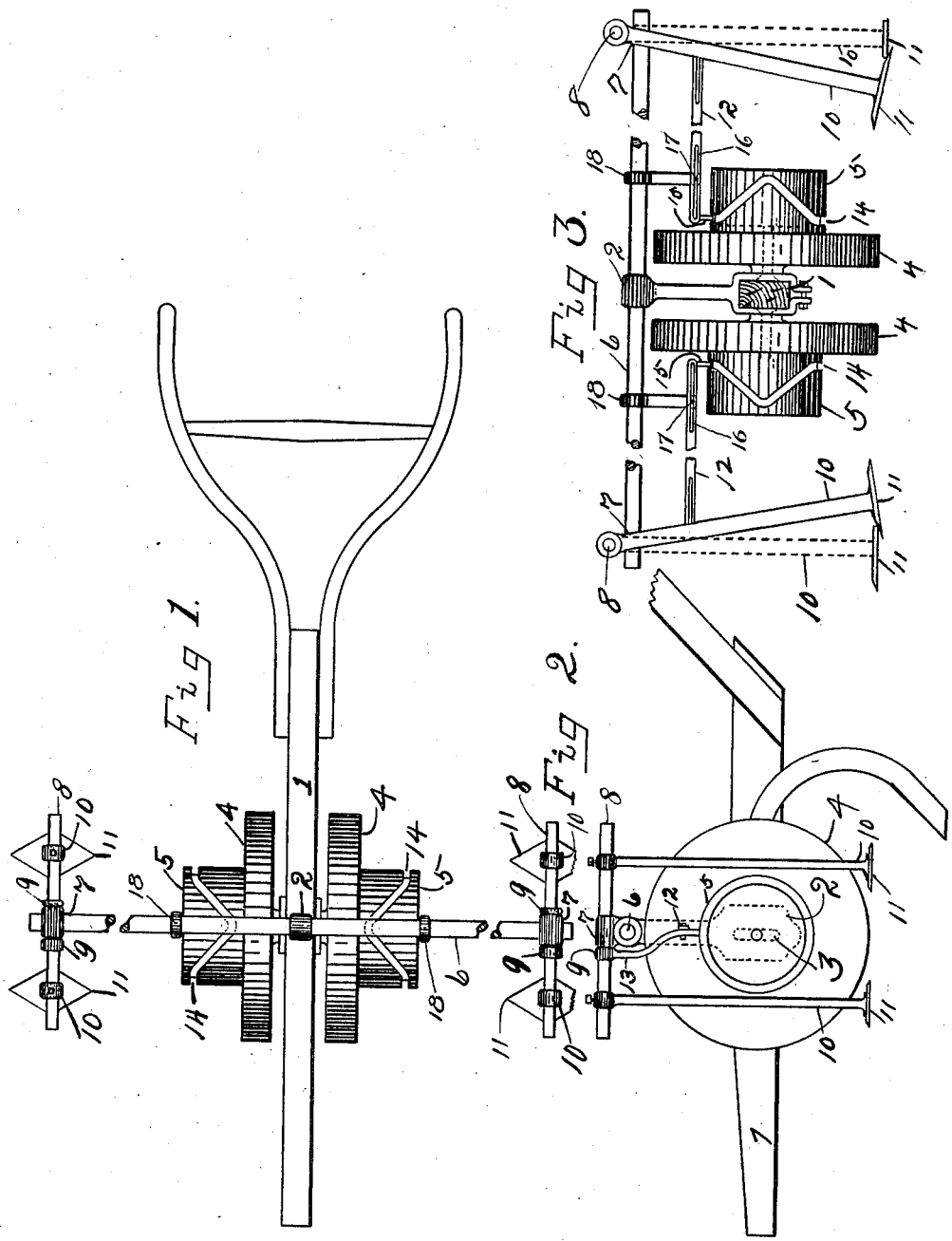

GREEN D. FARGASON, OF CAMP HILL, ALABAMA.

COTTON CHOPPER AND CULTIVATOR.

1,029,282. Specification of Letters Patent. Patented June 11, 1912.

Application filed June 16, 1911. Serial No. 633,532.

*To all whom it may concern:*

Be it known that I, GREEN D. FARGASON, a citizen of the United States, residing at Camp Hill, in the county of Tallapoosa and State of Alabama, have invented a new and useful Cotton Chopper and Cultivator, of which the following is a specification.

This invention relates to improvements in cotton choppers and cultivators, the objects of which are first, to provide a cheap and effective cotton chopper and cultivator which can be attached to any ordinary plow beam, second, to provide a cotton chopper and cultivator which can be adjusted to suit different distances apart of the cotton rows, and different distances apart of the cotton stalks in the said rows, third, to provide a cotton chopper and cultivator so designed as to chop one row, or two rows at the same time. I attain these and other objects by the mechanism shown in the accompanying drawing, which forms a part of this specification and which delineates the preferred form of my invention, although it is obvious that I can make various changes in the dimensions and other minor details without departing from the spirit of my invention.

Referring more particularly to the drawing: Figure 1 is a plan view with the hoes on one side partly broken away; Fig. 2, is a side elevation with the plow handles broken away; Fig. 3, is a back end elevation with the handles removed.
Similar numerals refer to similar parts throughout all views.

1 is the beam of an ordinary plow, 2 is a holder which is adjustably and removably attached to the beam 1, and is provided at its lower end, on each side, with an elongated slot 3, for the purpose of adjustably attaching the driving wheels 4 and the cam wheels 5, the said holder 2 is provided at its top end with means for engaging, and firmly holding the rod 6, which is held at right angles to the said beam 1. Each end of the said rod 6 is provided with a fulcrum 7 which is adjustable in a longitudinal direction, for the purpose of adapting
the device to chop cotton rows of varying distances apart. The said fulcrum 7 is adapted to pivotally engage a second rod 8, which is held at right angles to the said rod 6, and is prevented from getting out of place by suitable collars 9, each of the said rods 8 carry hoe levers 10, which are adjustably secured, to allow the cotton to be left standing at varying distances apart in the rows. The said hoe levers 10 are provided with suitably shaped double pointed hoes 11, which are moved in a transverse direction by means of the horizontal member 12, one end of which is longitudinally slotted for the purpose of adjustment and secured to the lever 13, the other end also has a longitudinal slot 16, which allows the said horizontal member 12 to slide back and forth on a pin 17, engaged by the hanger 18, the said lever 13 engaging the rod 8, the other end of the said horizontal member 12 engaging a zigzag channel 14 in the wheels 5, by means of the pin 15.

The operation of the machine is as follows: As the device is drawn over the ground the driving wheels 4 will impart motion to the channeled wheels 5 and the pin 15, which follows the zigzag channel 14 and engages the horizontal lever 12, which also engages the vertical hoe lever 10, will cause the said hoe lever 10 to reciprocate in a transverse direction as the machine moves in a longitudinal direction, which causes the hoes 11 to cut out a part of the cotton and cultivate the other.

Having thus described my invention what I claim as new and desire to secure by Letters Patent is—

In a cotton chopper and cultivator, the combination of a plow beam, driving wheels adjustably and removably attached thereto, a metal bar mounted transversely of the beam of the said plow, other metal bars mounted pivotally and transversely of the first named metal bar and carrying vertical levers adjustably mounted thereon, double pointed hoeing members firmly secured to the end of the said vertical levers, wheels having zigzag channels in their peripheries and attached to the aforementioned driving wheels, with means for connecting the said vertical levers to the said zigzag channeled wheels in such a manner as to cause a reciprocating transverse motion of the said vertical levers, substantially as shown and described.

In testimony that I claim the foregoing as my own, I have hereto affixed my signature in the presence of two witnesses.

GREEN D. FARGASON.

Witnesses:
 LUTHER LAND,
 C. L. CHESTER.

Copies of this patent may be obtained for five cents each, by addressing the "Commissioner of Patents, Washington, D. C."